United States Patent [19]
Tanahashi et al.

[11] Patent Number: 5,707,316
[45] Date of Patent: Jan. 13, 1998

[54] AUTOMATIC TRANSMISSION CONTROL APPARATUS

[75] Inventors: Katsuyuki Tanahashi; Yoshihisa Yamamoto; Hiroshi Tsutsui, all of Aichi-ken, Japan

[73] Assignee: Aisin AW Co., Ltd., Aichi-ken, Japan

[21] Appl. No.: 646,635

[22] Filed: May 8, 1996

[30] Foreign Application Priority Data

May 12, 1995 [JP] Japan ................................ 7-138376

[51] Int. Cl.$^6$ .................................................. F16H 61/06
[52] U.S. Cl. .......................... 477/116; 477/117; 477/156
[58] Field of Search .................................. 477/115, 116, 477/117, 143, 154, 155, 156, 158

[56] References Cited

U.S. PATENT DOCUMENTS

| | | | |
|---|---|---|---|
| 4,718,525 | 1/1988 | Yamaguchi | 477/166 |
| 5,078,028 | 1/1992 | Ishikawa et al. | 477/117 X |
| 5,090,270 | 2/1992 | Suzuki | 477/117 |
| 5,301,572 | 4/1994 | Tanaka et al. | 477/143 |
| 5,343,782 | 9/1994 | Jamzadeh | 477/156 |
| 5,385,511 | 1/1995 | Iizuka | 477/117 |
| 5,558,599 | 9/1996 | Tsukamoto et al. | 477/116 |

FOREIGN PATENT DOCUMENTS

| | | |
|---|---|---|
| 38 10013 A1 | 10/1989 | Germany . |
| 42 36 790 A1 | 5/1993 | Germany . |
| 3-28571 | 2/1991 | Japan . |
| 6-159494 | 6/1994 | Japan ...................... 477/116 |

*Primary Examiner*—Khoi Q. Ta
*Attorney, Agent, or Firm*—Oliff & Berridge, P.L.C.

[57] ABSTRACT

An automatic transmission control apparatus has a clutch, a hydraulic servo for the clutch, a fluid pressure control unit, a range shift detector, and an electronic control unit. The fluid pressure control unit has a manual valve, a pressure regulating valve device, and a changeover valve device. The electronic control unit controls the changeover valve device and the pressure regulating valve device. Immediately after a shift to the forward driving range, the electronic control unit holds the changeover valve device in such a state that a forward driving range pressure is supplied without passing through the pressure regulating valve device. Then, the electronic control unit shifts the changeover valve device to such a state that a regulated pressure is supplied from the pressure regulating valve device, which has been switched to a pressure regulating state by the electronic control unit. This control operation precisely sets the fluid pressure changeover timing and the initial fluid pressure.

10 Claims, 9 Drawing Sheets

FIG. 3

|   |      | Clutch | | | Brake | | | | One-Way Clutch | | |
|---|------|----|----|----|----|----|----|----|----|----|----|
|   |      | C1 | C2 | C3 | B1 | B2 | B3 | B4 | F1 | F2 | F3 |
| R |      | ×  | ○  | ×  | ×  | ×  | ○  | ○  | ×  | ×  | ×  |
| N |      | ×  | ×  | ×  | ×  | ×  | ×  | ○  | ×  | ×  | ×  |
| D | 1ST  | ○  | ×  | ×  | ×  | ×  | (○)| ○  | ×  | ○  | ○  |
|   | 2ND  | ○  | ×  | ×  | ○  | ○  | ×  | ○  | ○  | ×  | ○  |
|   | 3RD  | ○  | ×  | ○  | ○  | ○  | ×  | ×  | ○  | ×  | ×  |
|   | 4TH  | ○  | ○  | ○  | ×  | ○  | ×  | ×  | ×  | ×  | ×  |

5,707,316

AUTOMATIC TRANSMISSION CONTROL APPARATUS

BACKGROUND OF THE INVENTION

1. Field of the Invention

The invention relates to an automatic transmission control apparatus and, more particularly, to a control apparatus for controlling engagement of a clutch for transmitting rotation from an engine to a speed changing apparatus.

2. Description of the Related Art

A typical automatic transmission employs a clutch for transmitting rotation from an engine to a speed changing apparatus. Such a clutch is operated to engage by shifting the automatic transmission from the neutral range to the driving range. Since this engaging operation must be quickly performed without producing a shock, technology, such as disclosed in Japanese patent application laying-open No. HEI 3-28571, is used. This technology temporarily rapidly raises the fluid pressure supply to the hydraulic servo for engaging the clutch to a high fluid pressure (shelf pressure), and maintains the high fluid pressure for a period until the clutch starts to engage, that is, during the piston stroke of the hydraulic servo, in order to quickly complete the piston stroke, that is, to shorten the time taken until the engagement starts, and then rapidly lowers the fluid pressure to a low fluid pressure level before an initial period of the engagement, and gradually raises the fluid pressure as the engagement progresses, in order to reduce the engaging shocks. In this technology, the fluid pressure supply to the hydraulic servo is regulated by a pressure regulating valve on the basis of a signal pressure from a solenoid valve during the entire supply period. Thus, the conventional technology shortens the engaging time while reducing the engaging shocks.

However, in a case where a pressure regulating valve is employed to output a regulated fluid pressure, although the electrical signal to the solenoid valve for controlling the pressure regulating valve may be rapidly changed, it is normally difficult to cause the pressure regulating valve to follow the rapid change of the electrical signal. Thus, the fluid pressure actually output from the pressure regulating valve is inevitably delayed to some extent in response to the electrical signal, and becomes blunt. Viewed from this aspect, the above-described conventional technology in which the pressure regulating valve regulates the fluid pressure supply to the hydraulic servo, it is considered that the fluid pressure actually output from the pressure regulating valve will delay, as indicated by a broken line in FIG. 9, relative to an expected output fluid pressure (instructed value) indicated by a solid line. It is also of concern that a high fluid pressure may linger into a clutch engagement initial period during which the fluid pressure must be rapidly reduced to remove the shelf pressure. If this occurs, the clutch will rapidly engage, producing an engaging shock as illustrated by the output shaft torque (To), as shown by the lower of FIG. 9 broken line. Considering that the value of fluid pressure occurring at the start of the engagement has a greater effect on the engaging shocks than the fluid pressure characteristics over the rising process from the initial engagement period to the completion of the engagement, the excessively high fluid pressure at the start of the engagement is a disadvantage with regard to engaging shocks. Thus, the conventional art needs improvements in the reduction of actual engaging shocks.

SUMMARY OF THE INVENTION

Accordingly, it is a first object of the invention to reduce the clutch engaging time and further reduce the clutch engaging shocks by controlling the fluid pressure supply to a hydraulic servo for engaging the clutch that transmits rotation from an engine to a speed changing apparatus, with high precision in accordance with the realities, during a shift from the non-driving range to the driving range of the automatic transmission and, more particularly, at the start of the engagement of the clutch.

A second object of the invention is to further reduce the engaging shocks by setting the fluid pressure at the start of the engagement, which is a most important factor to reduce the engaging shocks as mentioned above, in accordance with the input torque to the clutch.

If the timing of starting to raise the fluid pressure in an engagement initial period significantly delays from the engagement start timing of the clutch, it takes a long time to complete the engagement. Conversely, if the raise start timing becomes too early, a rapid engagement will occur producing a considerable engaging shock. Accordingly, a third object of the invention is to further reduce the engaging time and the engaging shocks by starting to raise the fluid pressure synchronously with the timing at which the clutch engagement starts.

It is desirable for reduction of the engaging time that the period for supplying the forward driving range pressure to the hydraulic servo coincides with the period of the piston stroke of the hydraulic servo. However, even a slight overlap of the forward driving range pressure supplying period with the engagement start timing will increase the engaging shocks. Accordingly, a fourth object of the invention is to minimize the engaging time and reduce the engaging shocks by detecting the start of engagement of the clutch and supplying the forward driving range pressure for a maximized period before the start of the engagement.

However, even with the control wherein the start of engagement of the clutch is detected as mentioned above, a detection delay, which may occur for some cause, will result in a high fluid pressure lingering at the start of the engagement, causing engaging shocks. Accordingly, a fifth object of the invention is to reduce the engaging time as much as possible while allowing some detection errors or delay by supplying the forward driving range pressure for a period lasting until the elapse of a length of time predetermined to start when a shift to the forward driving range is performed and to end immediately before the clutch engagement starts.

According to the invention, there is provided an automatic transmission control apparatus comprising: a clutch which, when a forward driving range is selected, is engaged to transmit rotation from an engine to a speed changing apparatus; a hydraulic servo for selectively engaging and releasing the clutch; fluid pressure control means for controlling fluid pressure supply to the hydraulic servo; range shift detecting means for detecting shift from a non-driving range to the forward driving range; and electronic control means for controlling the fluid pressure control means on the basis of a signal from the range shift detecting means. The fluid pressure control means comprises: a manual valve for outputting a forward driving range pressure when the forward driving range is selected; pressure regulating means for regulating the forward driving range pressure on the basis of a signal from the electronic control means to output a regulated fluid pressure; and changeover means able to be selectively changed over between a first position for supplying the forward driving range pressure to the hydraulic servo, and a second position for supplying the regulated fluid pressure to the hydraulic servo, on the basis of a signal from the electronic control means. The electronic control means comprising: holding means for outputting a signal to the changeover means to hold the changeover means in the first position for a predetermined time period after the range shift detecting means has detected shift to the forward driving range, and to shift the changeover means to the second position when the predetermined time period elapses; and fluid pressure raising means for outputting a signal to the pressure regulating means to cause the pressure regulating means to output an initial fluid pressure that is lower than the forward driving range pressure, before or when the holding means shifts the changeover means to the second position, and to cause the pressure regulating means to gradually raise fluid pressure from the initial fluid pressure, when or after the holding means shifts the changeover means to the second position.

In a second structure of the invention, the control apparatus of the invention further comprises input torque detecting means for detecting input torque inputted from the engine to the speed changing apparatus, the electronic control means controls the fluid pressure control means on the basis of signals from the input torque detecting means and the range shift detecting means, and the fluid pressure raising means outputs a signal to the pressure regulating means to cause the initial fluid pressure to be a fluid pressure in accordance with the input torque detected by the input torque detecting means.

In a third structure of the invention, the control apparatus of the invention further comprises engagement detecting means for detecting the start of engagement of the clutch, and the fluid pressure raising means outputs a signal to the pressure regulating means to gradually raise fluid pressure from the initial fluid pressure when engagement of the clutch is detected on the basis of a signal from the engagement detecting means.

In a fourth structure of the invention, the control apparatus of the invention further comprises engagement detecting means for detecting the start of engagement of the clutch, and the predetermined time period during which the holding means holds the changeover means to the first position is a period starting when shift to the forward driving range is performed and ending when the start of engagement of the clutch is detected by the engagement detecting means.

In a fifth structure of the invention, the predetermined time period during which the holding means holds the changeover means to the first position is a period lasting until the elapse of a length of time predetermined to start when shift to the forward driving range is performed and to end immediately before the clutch is started to engage.

With the above-described basic structure of the invention, when the shift to the forward driving range causes the manual valve to output the forward driving range pressure, the forward driving range pressure is supplied directly to the hydraulic servo without passing through the pressure regulating means because, in this occasion, the changeover means is shifted to the first position for supplying the forward driving range pressure to the hydraulic servo by the holding means. The changeover means is maintained in the first position for a predetermined time period following the shift to the forward driving range, during which period the piston stroke of the hydraulic servo is quickly performed, thus enabling reduction of the engaging time. After the predetermined period elapses, the changeover means is shifted to the second position for supplying the hydraulic servo with a regulated pressure from the pressure regulating means. Since the pressure regulating means is set into a state for outputting an initial fluid pressure not later than the elapse of a predetermined length of time, the fluid pressure supply to the hydraulic servo is switched from the forward driving range pressure to the initial fluid pressure, which is lower than the forward driving range pressure, without delay. Thus, unlike the conventional art, the apparatus of the invention eliminates a delay in reducing the fluid pressure, preventing engaging shocks. Following the shifting of the changeover means to the second position, the fluid pressure supply to the hydraulic servo is gradually increased to gradually engage the clutch. According to the invention, since the changeover means switches from the state where the forward driving range pressure is supplied without passing through the pressure regulating means, to the state where a regulated fluid pressure is supplied from the pressure regulating means, the fluid pressure supply to the hydraulic servo will not delayed in response to the signal from the electronic control means. The invention thus reduces the engaging time while preventing the engaging shocks.

The second structure described above prevents the engaging shocks with enhanced reliability because of the setting of the initial fluid pressure in accordance with the input torque, in addition to optimization of the timing of switching the fluid pressure supply to the hydraulic servo.

The third structure described above further reduces the engaging time and the engaging shocks, since the engagement detecting means actually detects the start of engagement of the clutch and the fluid pressure raise is performed synchronously with the start of engagement of the clutch.

The fourth structure described above minimizes the engaging time while reducing the engaging shocks, since the engagement detecting means actually detects the start of engagement of the clutch so that the period for supplying the forward driving range pressure can be set to a period that ends immediately before the clutch starts to engage.

With the fifth structure described above, since the forward driving range pressure is supplied during a period lasting until elapse of a length of time predetermined to start when the shift to the forward driving range is performed and to end immediately before the clutch starts to engage, there is no possibility that the forward driving range pressure will continue to be supplied to the hydraulic servo when the clutch starts to engage. Thus, this structure further reduces the possibility of the occurrence of engaging shocks.

BRIEF DESCRIPTION OF THE DRAWINGS

The foregoing and further objects, features and advantages of the invention will become apparent from the following description of preferred embodiments with reference to the accompanying drawings, wherein:

FIG. 3 is a table showing various operations of the automatic transmission;

DETAILED DESCRIPTION OF PREFERRED EMBODIMENTS

A preferred embodiment of the invention will be described hereinafter with reference to the accompanying drawings.

Figure 1:
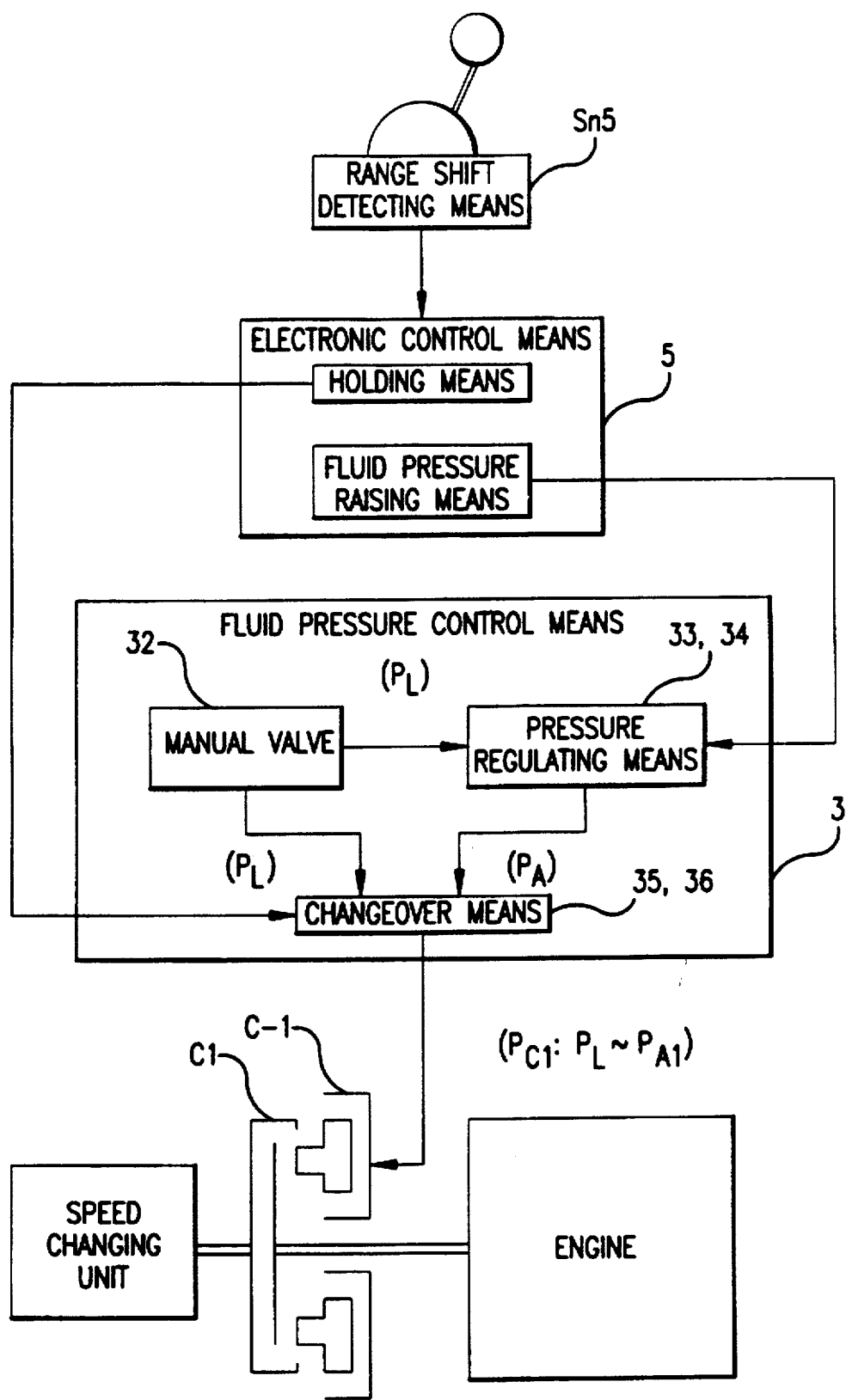
FIG. 1 is a conceptual block diagram of a first embodiment of the present invention.

Referring to FIG. 1, an automatic transmission control apparatus according to a first embodiment comprises: a clutch C1 which, when a forward driving range is selected, is engaged to transmit rotation from an engine to a speed changing apparatus; a hydraulic servo C-1 for selectively engaging and releasing the clutch C1; fluid pressure control means 3 for controlling fluid pressure ($P_{C1}$) to be supplied to the hydraulic servo C-1; range shift detecting means Sn5 for detecting shift from a non-driving range to a forward driving range; and electronic control means 5 for controlling the fluid pressure control means 3 on the basis of a signal from the range shift detecting means Sn5.

The fluid pressure control means 3 has: a manual valve 32 for supplying a forward driving range pressure ($P_L$) to the hydraulic servo C-1 when the forward driving range is selected; pressure regulating means 33, 34 for regulating the forward driving range pressure ($P_L$) on the basis of a signal from the electronic control means 5 to output a regulated fluid pressure ($P_A$); and changeover means 35, 36 able to be selectively changed over between a first position for supplying the forward driving range pressure ($P_L$) to the hydraulic servo C-1, and a second position for supplying the regulated fluid pressure ($P_A$) to the hydraulic servo C-1.

The electronic control means 5 comprises: holding means for outputting a signal to the changeover means 35, 36 to hold the changeover means 35, 36 in the first position for a predetermined time period after the range shift detecting means Sn5 has detected a shift to the forward driving range, and to shift the changeover means 35, 36 to the second position when the predetermined time period elapses; and fluid pressure raising means for outputting a signal to the pressure regulating means 33, 34 to cause the pressure regulating means 33, 34 to output an initial fluid pressure ($P_{AI}$) that is lower than the forward driving range pressure ($P_L$), before or when the holding means shifts the changeover means 35, 36 to the second position, and to cause the pressure regulating means 33, 34 to gradually raise the fluid pressure from the initial fluid pressure ($P_{AI}$), when or after the holding means shifts the changeover means 35, 36 to the second position.

Figure 2:
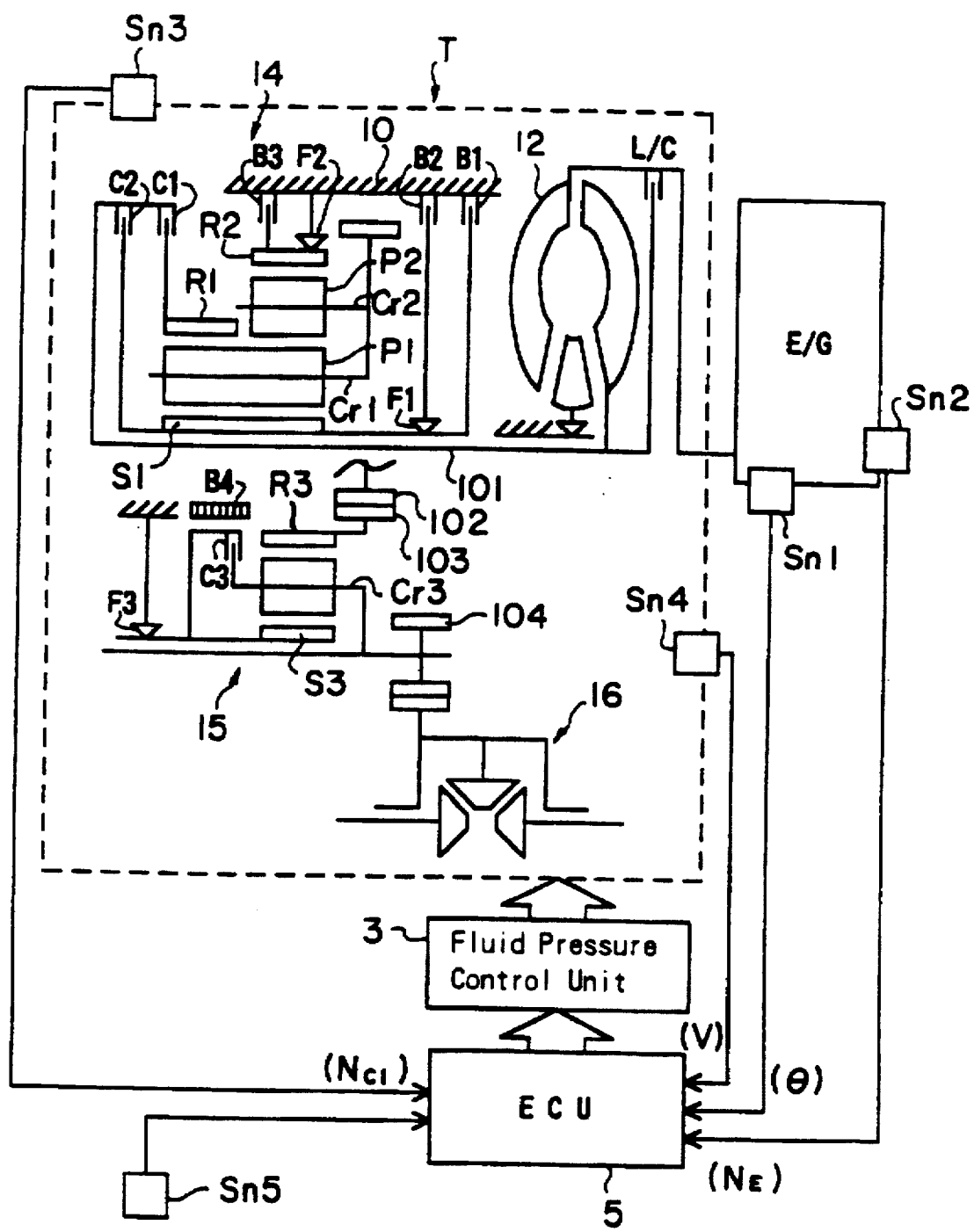
FIG. 2 is a block diagram of the overall structure of an automatic transmission according to the first embodiment, illustrating the mechanical portions in schematic form.

Various components will be described in detail. As illustrated in FIG. 2, the automatic transmission T according to this embodiment has a gear train of four forward speeds and one reverse speed for a front-engine front wheel-drive vehicle. The automatic transmission T comprises: a torque converter 12 having a lockup clutch denoted by an abbreviation L/C in the drawing; a biaxial gear train having a main speed changing unit 14 and an under drive-type planetary gear unit 15; the differential unit 16; a fluid pressure control unit 3, provided as the fluid pressure control means, for controlling the gear train and the lockup clutch L/C; and an electronic control unit (indicated by an abbreviation ECU in the drawing) 5, provided as the electronic control means, for controlling the fluid pressure control unit 3.

FIG. 2 further shows an engine E/G, a throttle sensor Sn1 for detecting throttle opening (θ) of the engine E/G; an engine speed sensor Sn2 for detecting engine speed ($N_E$); a clutch C1 rotational speed sensor Sn3 for detecting rotational speed ($N_{C1}$) of the clutch C1 provided as the first friction engaging means of the automatic transmission T; a vehicle speed sensor Sn4 for detecting vehicle speed (V) based on output speed; and a neutral start switch Sn5 provided as range shift detecting means for detecting shift position. The electronic control unit 5 is a control computer that outputs control signals to the on-off solenoid valve and linear solenoid valve of the fluid pressure control unit 3 on the basis of information from the various sensors, mainly in accordance with the throttle opening (θ) and the vehicle speed (V), following the installed program.

The main speed changing unit 14 of the gear train of the automatic transmission T comprises a single pinion-type planetary gear unit and a double pinion-type planetary gear unit. The two gear units are combined by using an integrated sun gear S1 and integrating with one set of pinion gears P1 of the double pinion-type gear unit with the planetary gears of the single pinion-type gear unit, and by connecting a carrier Cr1 supporting the pinion gears P1 and a carrier Cr2 supporting the other set of pinion gears P2 of the double pinion-type gear unit. The sun gear S1, common to the two gear units of the main speed changing unit 14, is fixable to a transmission casing 10 by a brake B1, and also fixable to the casing 10 by a one-way clutch F1 and a brake B2 that are disposed in series. A ring gear R1 of the single pinion-type gear unit is connected to an input shaft 101 by the clutch C1 according to the present invention. The sun gear S1 is connected to the input shaft 101 by a clutch C2. The input shaft 101 is connected to a turbine output shaft of the torque converter 12. The carrier Cr1 supporting the pinion gears P1 meshed with the sun gear S1, the ring gear R1 and the pinion gears P2 and the carrier Cr2 supporting the pinion gears P2 meshed with the pinion gears P1 and a ring gear R2 are connected by a counter gear 102. The ring gear R2 of the double pinion-type gear unit is fixable to the transmission casing 10 by a brake B3 and a one-way clutch F2 that are disposed in parallel.

A ring gear R3 of the under drive planetary gear unit 15 is an input element connected to the main speed changing unit 14 by the counter gears 102, 103. A carrier Cr3 and a sun gear S3 are connected by a clutch C3. The sun gear S3 is fixable to the transmission casing 10 by a one-way clutch F3 and a band brake B4 that are disposed in parallel. The carrier Cr3 is connected to an output gear 104 for transmission to the differential unit 16.

In the gear train structured as described above, under an under drive rotational state where the sun gear S3 of the under drive planetary gear unit 15 is fixed with the clutch C3 released and the brake B4 engaged, so as to achieve input to the ring gear R3 and output from the carrier Cr3, the first speed is achieved when the input transmitted to the ring gear R1 by engagement of the clutch C1 of the main speed changing unit 14 is outputted as rotation of the carriers Cr1, Cr2 by reaction force support of the ring gear R2 provided by engagement of the one-way clutch F2. The second speed is achieved when the input to the ring gear R1 is output as rotation of the carriers Cr1, Cr2 while the sun gear S1 is fixed by the engagement of the brake B2. The third speed is achieved when the main speed changing unit 14 is in the direct-coupled state where the clutch C2 is additionally engaged to rotate the ring gear R1 and the sun gear S1 at the same speed, so that the input rotation is directly output from the carriers Cr1, Cr2. In a direct-coupled state of the under drive planetary gear unit 15, achieved by release of the brake B4 and engagement of the clutch C3, the fourth speed is achieved. The reverse is reached when the clutch C2 is engaged and the brake B3 is engaged to achieve input to the sun gear S1 and the fixation of the ring gear R2 so that the rotation of the carrier Cr2 reverses.

FIG. 3 is a table showing the relationship between the operation of the clutches, the brakes and the one-way clutches and the thereby-achieved gear speeds, that is, the first speed to the fourth speed. In the table, "R" indicates the reverse drive shift position; "N" indicates the neutral position; "D" indicates the forward drive shift positions; "O" indicates engagement; "X" indicates release; and (O) indicates engagement effected only during engine braking.

Figure 4:
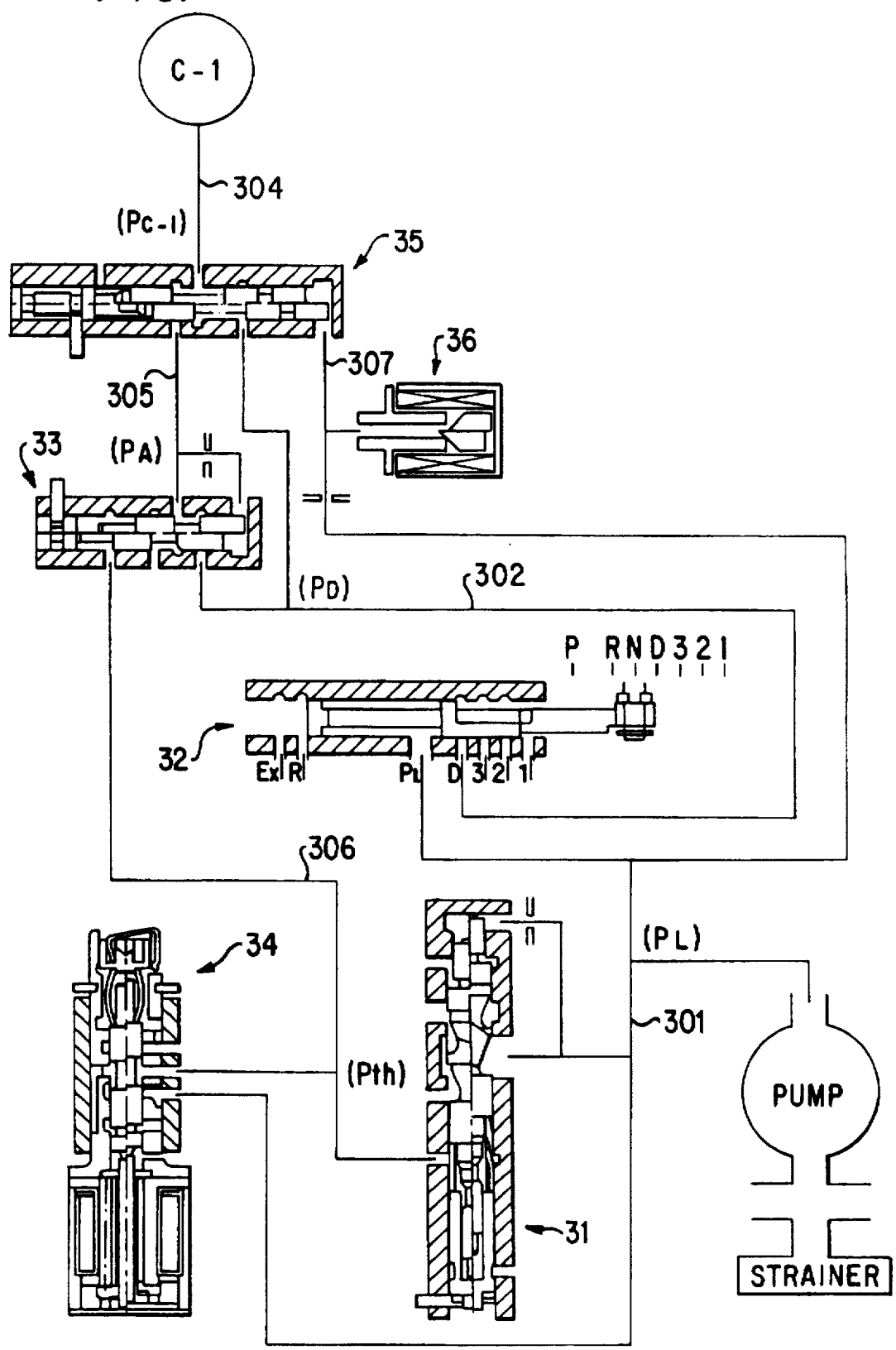
FIG. 4 is a partial circuit diagram of a fluid pressure control unit of the automatic transmission.

Referring to FIG. 4, the hydraulic circuit for controlling the gear train as described above comprises, similar to the hydraulic circuit of a conventional fluid pressure control apparatus, an oil pump (PUMP) as a fluid pressure source incorporated in the speed changing mechanism, various pressure regulating valves that include a primary regulator valve 31 for regulating the pressure from the oil pump to a predetermined stable line pressure ($P_L$) in accordance with the vehicle speed and the throttle opening to output a secondary pressure and a secondary regulator valve (not shown) for reducing the secondary pressure to a regulated torque converter pressure supply and outputting the remaining pressure as a lubrication pressure, the manual valve 32, various solenoid valves, various shift valves, orifices and check valves disposed in the passages connecting the various valves.

FIG. 4 is illustrates only those portions of the above-described hydraulic circuit that are relevant to the present invention. This circuit comprises the manual valve 32, a C-1 control valve 33 and the linear solenoid valve 34 for controlling the C-1 control valve 33, the C-1 control valve 33 and the linear solenoid valve 34 being provided as the pressure regulating means, and a C-1 changeover valve 35 and the solenoid valve 36 for controlling the C-1 changeover valve 35, which are provided as the changeover means. The manual valve 32 is connected to a line pressure supply fluid passage 301 and a range pressure output fluid passage 302 so as to output a D range pressure, that is, a line pressure ($P_L$) in accordance with current throttle opening (θ), when the forward driving range, that is, the D range, is selected.

The C-1 control valve 33 is a secondary pressure-operated pressure reducing valve that receives at the opposite ends of the spool the throttle signal pressure ($P_{th}$) and the feedback pressure of the regulated fluid pressure ($P_A$) to the clutch C1 to adjust the openings of the output, input and drain ports. The input port is connected to the range pressure fluid passage 302. The output port is connected to an apply pressure output fluid passage 305. The signal port is connected to a throttle signal pressure fluid passage 306. The feedback port is connected to the apply pressure output fluid passage 305 through an orifice. The linear solenoid valve 34 outputs the throttle signal pressure ($P_{th}$) provided by reducing the line pressure ($P_L$) as the basic pressure, on the basis of the signal from the electronic control unit 5. The throttle signal pressure ($P_{th}$) is supplied to the primary regulator valve 31 and the C-1 control valve 33 through the throttle signal pressure fluid passage 306. Thus, the C-1 control valve 33 and the linear solenoid valve 34 perform the function of the pressure regulating means for regulating the line pressure ($P_L$) on the basis of the signal from the electronic control unit 5 and for outputting the regulated fluid pressure ($P_A$).

The C-1 changeover valve 35 is a spool-type changeover valve that selectively communicates the output port with the input port connecting to the apply pressure output fluid passage 305 or the input port connecting to the range pressure fluid passage 302. The C-1 changeover valve 35 is switched by a solenoid signal pressure opposing the spring force acting on an end of the spool. The solenoid valve 36 is a normal open-type on-off valve that closes upon receiving the solenoid signal from the electronic control unit 5. The solenoid valve 36 drains the fluid pressure from a solenoid signal pressure fluid passage 307 connecting to the line fluid passage 301 through an orifice and stops draining the pressure. Thus, the C-1 changeover valve 35 and the solenoid valve 36 perform the function of the changeover means able to be selectively changed over between a first position (indicated in the lower half of the illustration of each of the valves in the drawing) for supplying the line pressure ($P_L$) to the hydraulic servo C-1 of the clutch C1 through the fluid passage 304 and second position (indicated in the upper half of the illustration of each of the valves in the drawing) for supplying the regulated fluid pressure ($P_A$) thereto, by the signal from the electronic control unit 5.

Figure 5:
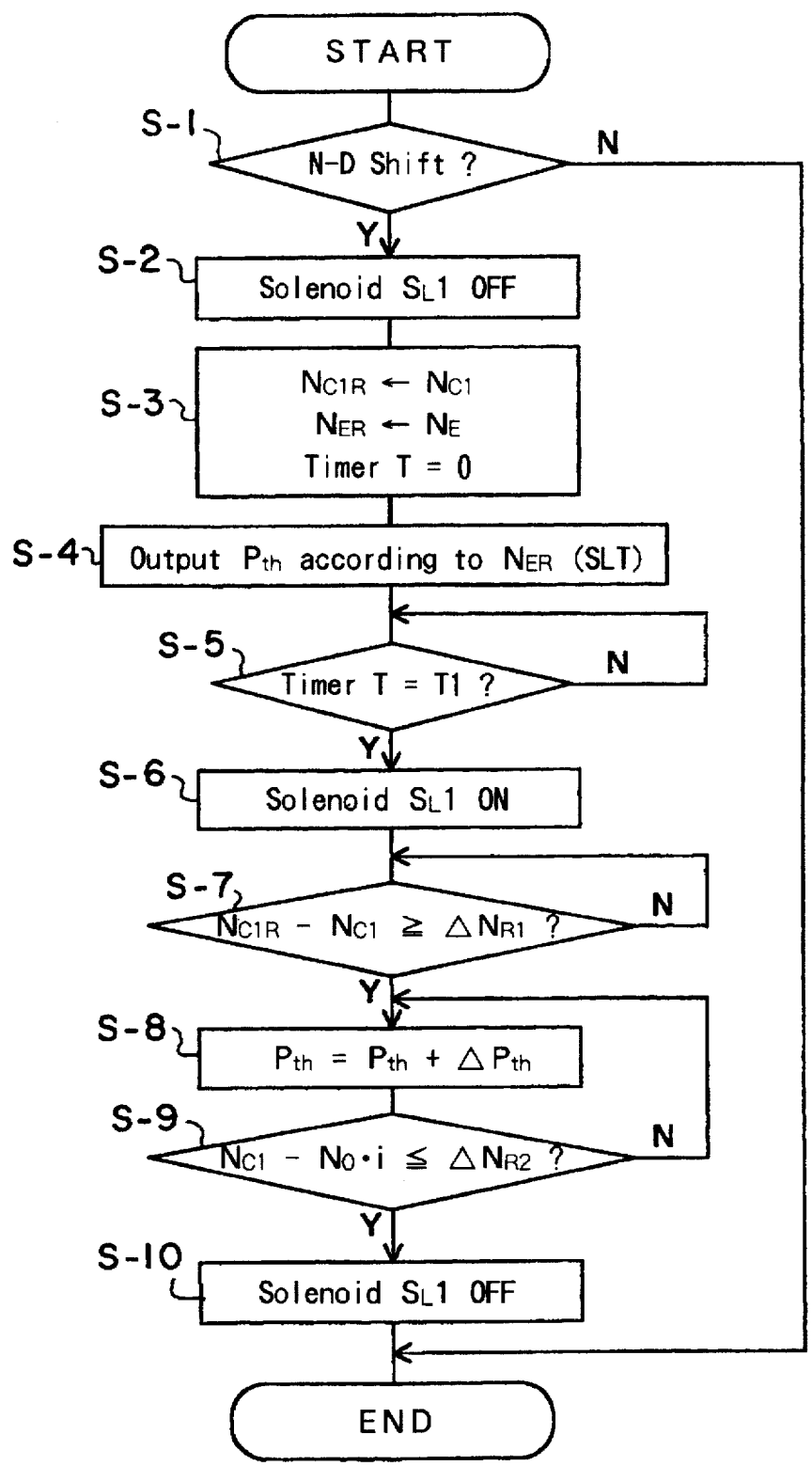
FIG. 5 is a flowchart illustrating the operation of the control apparatus according to the first embodiment.

The thus-structured hydraulic circuit as shown in FIG. 4 is controlled by the electronic control unit 5. Referring to the flowchart shown in FIG. 5, step S-1 determines whether the shift from the neutral range to the drive range (hereinafter, referred to as "N-to-D shift") has been performed, on the basis of the signal from the neutral start switch Sn5. An affirmative determination is followed by step S-2 where the magnetizing signal $S_L1$ to the solenoid valve 36 is turned off. The fluid pressure of the fluid passage 307 is thus drained, so that the C-1 changeover valve 35 takes the first position, that is, the position of the spool indicated in the lower half the illustration of the valve in the drawing. Thereby, the line pressure ($P_L$) of the range pressure fluid passage 302 starts to be supplied to the hydraulic servo C-1 via the C-1 changeover valve 35 and the fluid passage 304. The following step S-3 sets the current rotational speed ($N_{C1}$) of the clutch C1 as the clutch rotational speed ($N_{C1R}$) at the time of the N-to-D shift, and the current engine speed ($N_E$) as the engine speed ($N_{ER}$) at the time of the N-to-D shift, and also resets a timer T. In step S-4, the C-1 control valve 33 is supplied with the signal pressure ($P_{th}$) from the linear solenoid valve 34 in accordance with the input torque, and the C-1 control valve 33 outputs a regulated fluid pressure ($P_A$) in accordance with the signal pressure ($P_{th}$). According to this embodiment, the signal pressure ($P_{th}$) is set in accordance with the engine speed ($N_{ER}$) set in step S-3. Step S-5 determines whether the value of the timer T has become T1. According to this embodiment, the timer value T1 is preset to a time point slightly preceding the time point to start engaging the clutch C1. The reason for this setting is that if the timer is set so that the magnetizing signal $S_L1$ to the solenoid is turned on by the start of the engagement, detection delay may cause an incident where the hydraulic servo C-1 is supplied with the line pressure ($P_L$) even though the clutch C1 has started engaging. The steps described above perform the control for causing the hydraulic servo C-1 to rapidly operate its piston until the engagement is achieved.

If step S-5 determines that the value of the timer T has become equal to T1 after repeating time measurement of the timer T, the following step S-6 turns on the magnetizing signal $S_L1$ to the solenoid valve 36. The C-1 changeover valve 35 is thereby switched to supply the hydraulic servo C-1 with an apply pressure ($P_A$) from the C-1 control valve 33 caused to output the regulated stable fluid pressure ($P_A$) in step S-4. Then, step S-7 determines that the engagement has started, when the current rotational speed ($N_{C1}$) of the clutch C1 has become less than the rotational speed ($N_{C1R}$) of the clutch C1 at the time of the N-to-D shift, by at least a predetermined value ($\Delta N_{R1}$). Based on the determination in step S-7, the following step S-8 increases the fluid pressure supply ($P_{C1}$) to the hydraulic servo C-1 by a predetermined amount ($\Delta P_{th}$) in a cycle of a predetermined length of time. The predetermined amount ($\Delta P_{th}$) is preset in accordance with the input torque. More specifically, the predetermined amount ($\Delta P_{th}$) increases with increases in the input torque. The input torque is detected on the basis of the throttle opening ($\theta$) according to this embodiment. Then, step S-9 determines that the control is to be ended, when the clutch C1 has substantially completed engagement. More specifically, when the difference between the current input rotational speed ($N_{C1}$) of the clutch C1 and the output rotational speed (No·i) (that is, the rotational speed obtained by multiplying the first speed gear ratio i with the output rotational speed (No) detected by the vehicle speed sensor Sn4) of the clutch C1 has become a predetermined value ($\Delta N_{R2}$) or less. Based on the determination by step S-9, the last step S-10 turns off the signal $S_L 1$ to the solenoid valve 36. The C-1 changeover valve 35 is thereby switched back to the state for directly supplying the line pressure ($P_L$).

Figure 6:
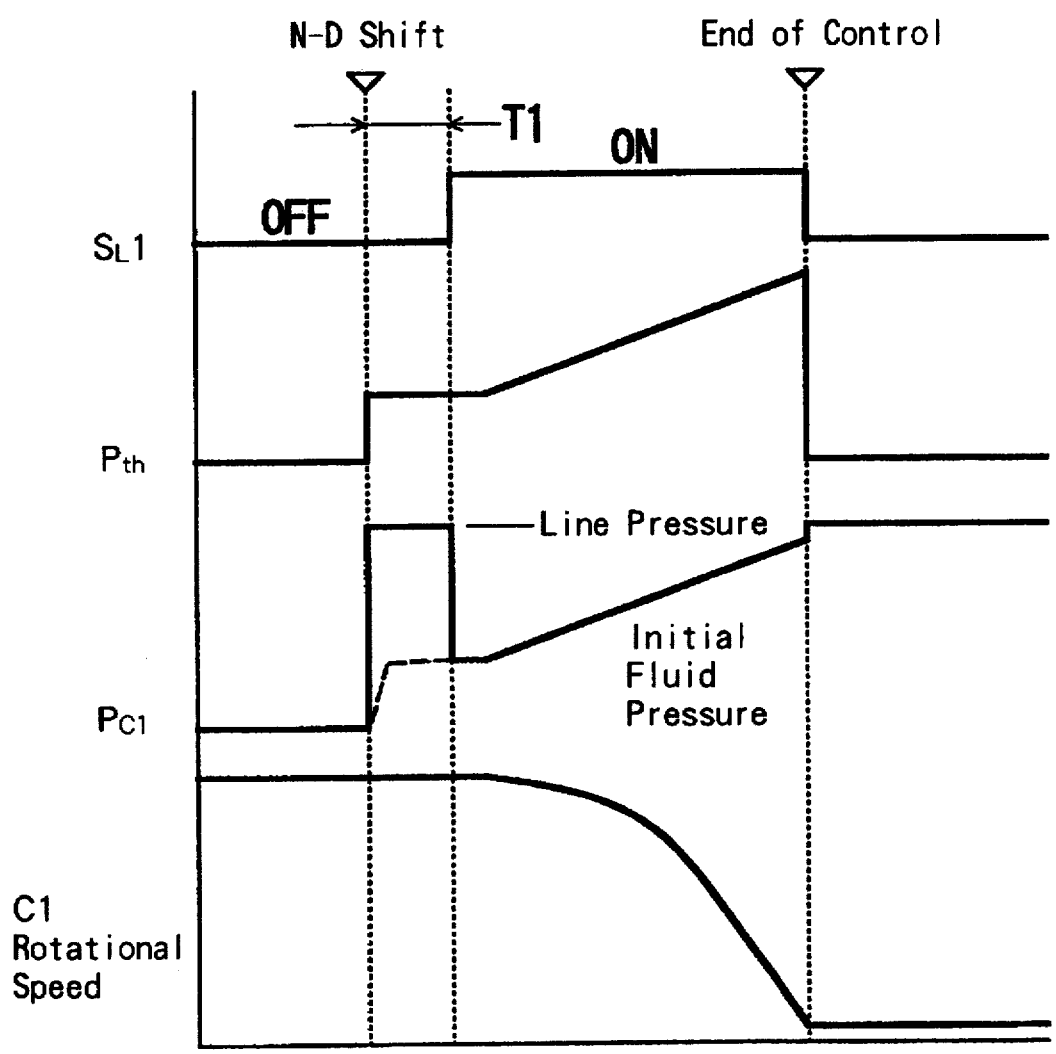
FIG. 6 shows timing charts indicating the operation of the control apparatus according to the first embodiment.

FIG. 6 shows a timing chart corresponding to the flowchart described above. As in the throttle signal pressure ($P_{th}$), the regulated fluid pressure ($P_A$) regulated by the throttle signal pressure ($P_{th}$) is regulated to the initial fluid pressure ($P_{AI}$) at the time of N-to-D shift and maintained thereat, so that the clutch servo C-1 is supplied with a precise pressure supply at the initial time of the turning on of the solenoid valve 36 and later on. A broken line in FIG. 6 indicates the actual fluid pressure inside the hydraulic servo C-1, illustrating that the actual pressure inside the hydraulic servo C-1 remains relatively low during the piston stroke of the hydraulic servo C-1. As a feature of this embodiment, the timer measurement time T1 is preset to elapse slightly before the clutch actually starts to engage, so that the pressure supply ($P_{C1}$) to the hydraulic servo C-1 starts to rise slightly later than the timing of switching the C-1 changeover valve.

Figure 7:
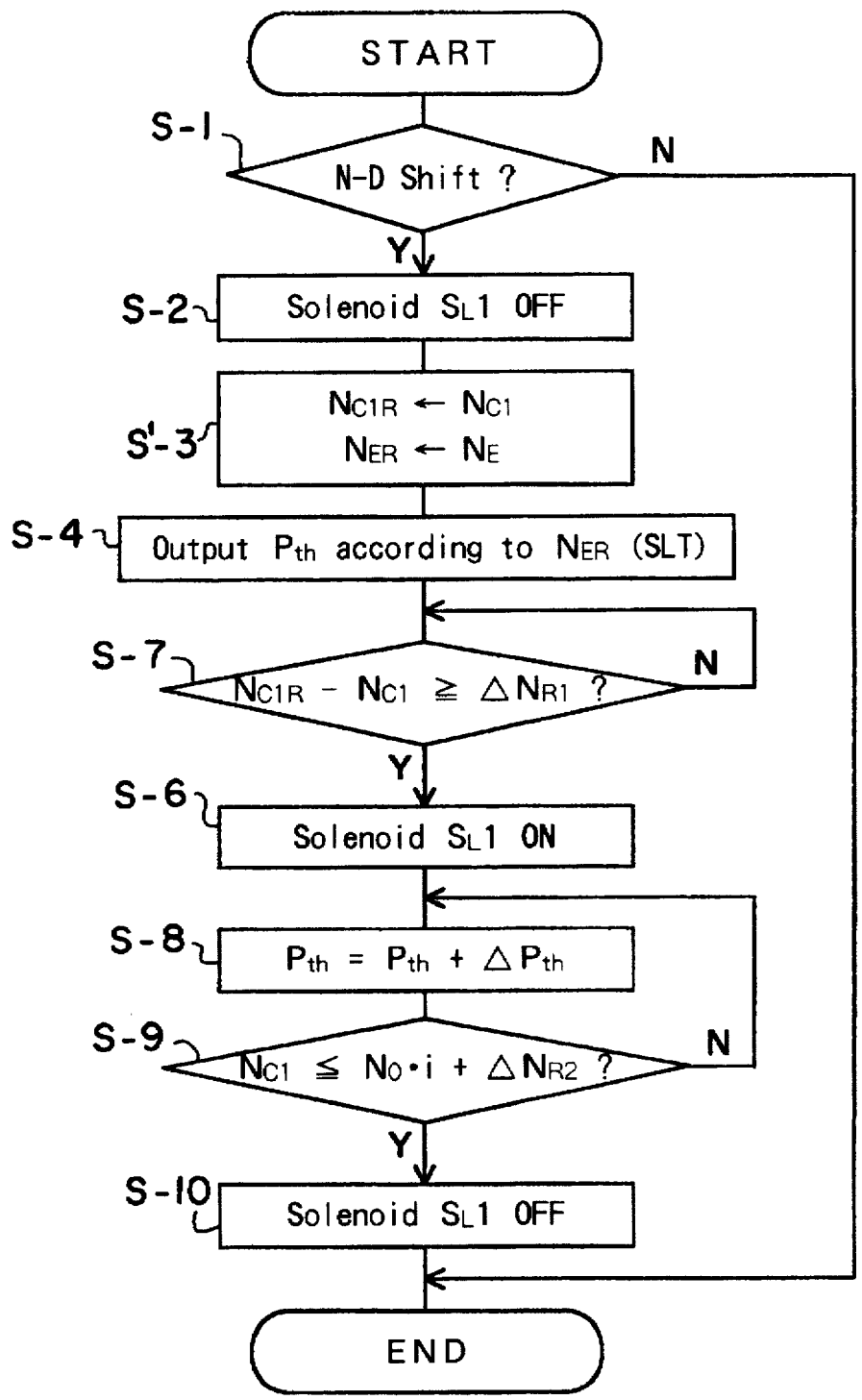
FIG. 7 is a flowchart illustrating the operation of the control apparatus according to a second embodiment.

FIG. 7 is a flowchart according to a second embodiment wherein the control manner is modified. According to this embodiment, the timing of turning on the signal $S_L 1$ to the solenoid 36 is preset to coincide with the engagement starting timing of the clutch C1, instead of making determination based on the time measurement of the timer T as performed in the first embodiment. Thus, the resetting of the timer T to "0" is eliminated from step S-3' that corresponds to step S-3 according to the first embodiment, and the timer measurement operation in step S-5 is also eliminated. Since the timing of turning on the solenoid 36 coincides with the engagement starting timing of the clutch C1 according to the second embodiment, the clutch engagement determining operation in step S-7 of determining whether the clutch C1 has been engaged precedes the operation of turning on the solenoid 36 in step S-6, unlike the first embodiment. The determination and operations in the other steps are substantially the same as those according to the first embodiment. The comparable steps are denoted by comparable reference characters and will not be described again.

Figure 8:
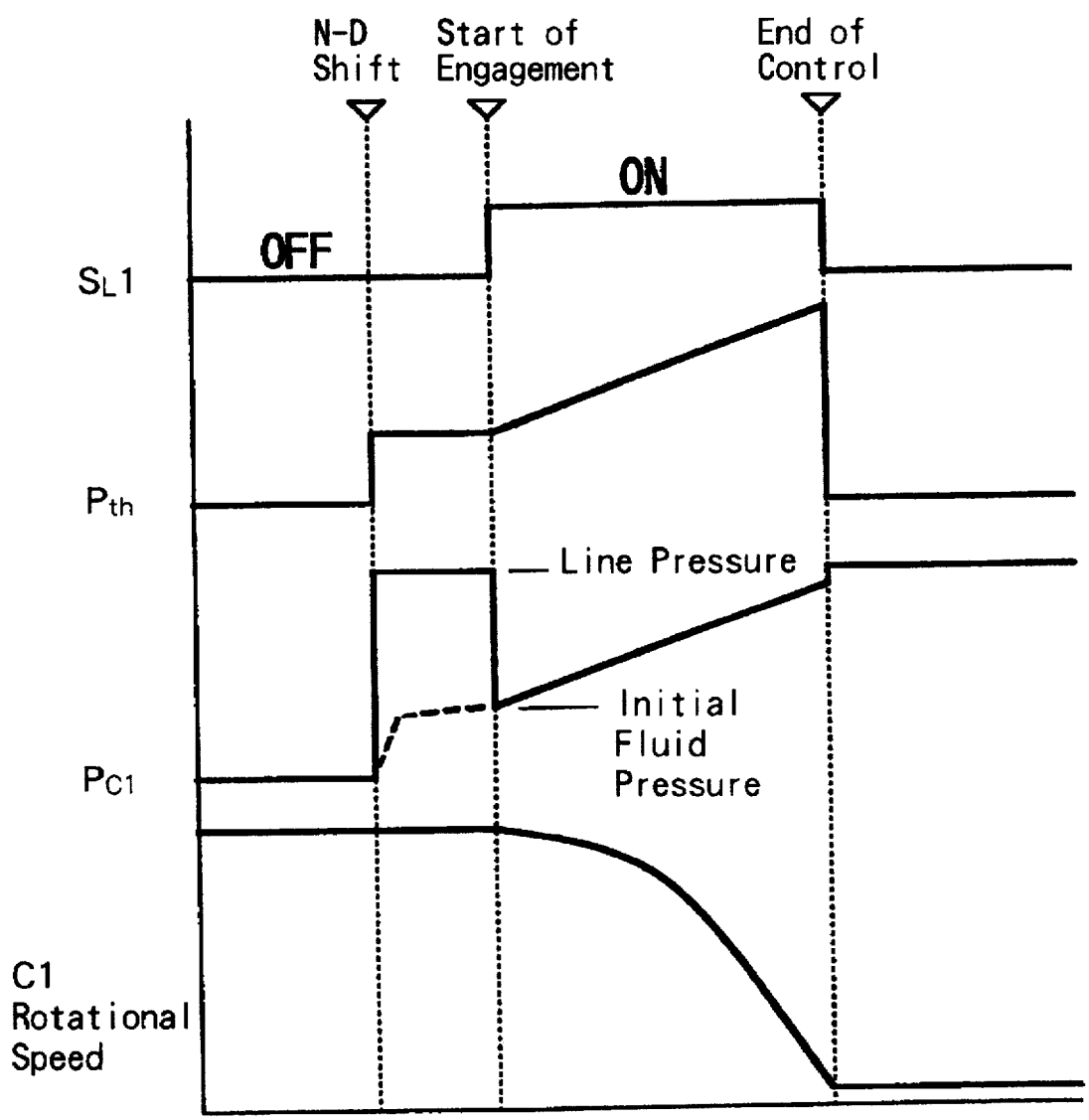
FIG. 8 shows timing charts indicating the operation of the control apparatus according to the second embodiment.
Figure 9:
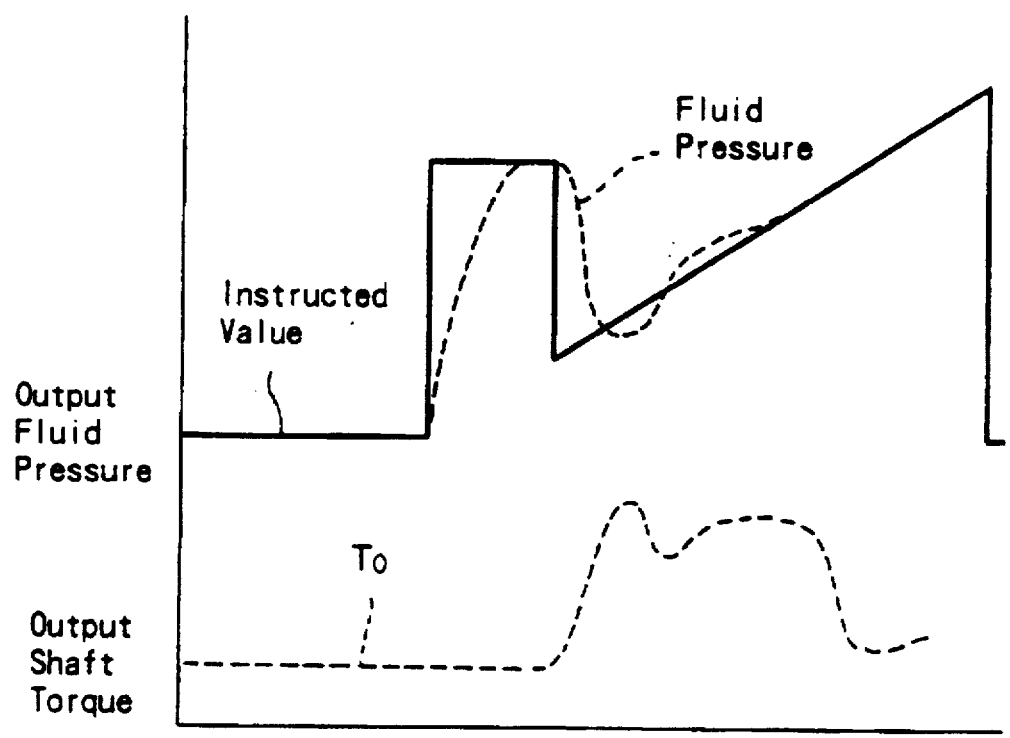
FIG. 9 indicates characteristics of the pressure supply achieved by a conventional automatic transmission control apparatus.

FIG. 8 shows a timing chart corresponding to the flowchart according to the second embodiment. This embodiment is distinguished from the first embodiment in that the pressure supply ($P_{C1}$) to the hydraulic servo C-1 starts rising synchronously with the timing of switching the C-1 changeover valve 35 since the timing of turning on the signal $S_{L1}$ to the solenoid 36 is set to coincide with the engagement starting time point of the clutch C1. With this manner of control, the period during which the line pressure ($P_L$) is supplied to rapidly operate the piston of the hydraulic servo C-1 to achieve the engagement can be maximized. Thus, the control according to the second embodiment can achieve a shorter clutch engaging time than the control according to the first embodiment.

According to the two embodiments described above, when the N-to-D shift causes the manual valve 32 to output the line pressure ($P_L$), the holding means (corresponding to steps S-3 to S-5 according to the first embodiment, and steps S-3' to S-7 according to the second embodiment) provided in the form of programs installed in the electronic control unit 5 shifts the changeover means 35, 36 to the first position for supplying the line pressure ($P_L$) to the hydraulic servo C-1, so that the line pressure ($P_L$) from the manual valve 32 is supplied to the hydraulic servo C-1. This state where the changeover means 35, 36 is in the first position is maintained for a predetermined time period following the N-to-D shift, during which the rapid piston stroke of the hydraulic servo C-1 is performed, thus enabling a reduction in the engaging time. After the predetermined period elapses, the changeover means 35, 36 is shifted to the second position for supplying the hydraulic servo C-1 with the regulated pressure ($P_A$) from the pressure regulating means 33, 34. Since the pressure regulating means 33, 34 is set into a state for stably outputting the initial fluid pressure ($P_{AI}$) not later than the elapse of a predetermined length of time, the fluid pressure supply ($P_{C1}$) to the hydraulic servo C-1 is switched from the line pressure ($P_L$) to the initial fluid pressure ($P_{AI}$), which is lower than the line pressure ($P_L$), without delay. Thus, unlike the conventional art, the embodiments eliminate a delay in reducing the fluid pressure, preventing engaging shocks. Following the shifting of the changeover means 35, 36 to the second position, the fluid pressure supply ($P_{C1}$) to the hydraulic servo C-1 is gradually increased from the initial fluid pressure ($P_{AI}$) to gradually engage the clutch C1, under the control by the fluid pressure raising means (corresponding to step S-8 according to the first and second embodiments) provided in the form of a program installed in the electronic control unit 5. According to the embodiments, since the changeover means 35, 36 switches from the state where the line pressure ($P_L$) is supplied without passing through the pressure regulating means 33, 34, to the state where the regulated fluid pressure ($P_A$) is supplied from the pressure regulating means 33, 34, the embodiments will rapidly reduce the fluid pressure supply ($P_{C1}$) to the hydraulic servo C-1 to the initial fluid pressure ($P_{AI}$) without delay. The embodiments thus reduce the engaging time while preventing the engaging shocks.

Although the invention has been described with reference to what are presently considered to be preferred embodiments thereof, it is to be understood that the invention is not limited to the disclosed embodiments. To the contrary, the invention is intended to cover various modifications and equivalent arrangements included within the spirit and scope of the appended claims.

What is claimed is:

1. An automatic transmission control apparatus, comprising:
   a clutch which, when a forward driving range is selected, is engaged to transmit rotation from an engine to a speed changing apparatus;
   a hydraulic servo for selectively engaging and releasing said clutch;
   fluid pressure control means for controlling fluid pressure supply to said hydraulic servo;

range shift detecting means for detecting shift from a non-driving range to said forward driving range; and electronic control means for controlling said fluid pressure control means on the basis of a signal from said range shift detecting means, said fluid pressure control means comprising:

a manual valve for outputting a forward driving range pressure when said forward driving range is selected;

pressure regulating means for regulating said forward driving range pressure on the basis of a signal from said electronic control means to output a regulated fluid pressure; and changeover means able to be selectively changed over from a first position for supplying said forward driving range pressure to said hydraulic servo to a second position for supplying said regulated fluid pressure to said hydraulic servo, on the basis of a signal from said electronic control means, said electronic control means comprising:

holding means for outputting a signal to said changeover means to hold said changeover means in said first position for an expected time period for starting clutch engagement after said range shift detecting means has detected shift to said forward driving range, and to shift said changeover means to said second position when said expected time period elapses; and fluid pressure raising means for outputting a signal to said pressure regulating means to cause said pressure regulating means to output an initial fluid pressure that is lower than said forward driving range pressure, before or when said holding means shifts said changeover means to said second position, and for outputting a signal to said pressure regulating means to cause said pressure regulating means to gradually raise fluid pressure from said initial fluid pressure, when or after said holding means shifts said changeover means to said second position.

2. The automatic transmission control apparatus according to claim 1, further comprising input torque detecting means for detecting input torque input from said engine to said speed changing apparatus, said electronic control means controlling said fluid pressure control means on the basis of signals from said input torque detecting means and said range shift detecting means, said fluid pressure raising means outputting a signal to said pressure regulating means to cause said initial fluid pressure to become a fluid pressure in accordance with the input torque detected by said input torque detecting means.

3. The automatic transmission control apparatus according to claim 1, further comprising engagement detecting means for detecting start of engagement of said clutch, said fluid pressure raising means outputting a signal to said pressure regulating means to raise fluid pressure from said initial fluid pressure when engagement of said clutch is detected on the basis of a signal from said engagement detecting means.

4. The automatic transmission control apparatus according to claim 1, further comprising engagement detecting means for detecting start of engagement of said clutch, said expected time period during which said holding means holds said changeover means to said first position being a period starting when shift to said forward driving range is performed and ending when said start of engagement of said clutch is detected by said engagement detecting means.

5. The automatic transmission control apparatus according to claim 1, wherein said expected time period during which said holding means holds said changeover means to said first position is a period lasting until elapse of a length of time predetermined to start when shift to said forward driving range is performed and end immediately before said clutch is started to engage.

6. The automatic transmission control apparatus according to claim 2, further comprising engagement detecting means for detecting start of engagement of said clutch, said fluid pressure raising means outputting a signal to said pressure regulating means to gradually raise fluid pressure from said initial fluid pressure when engagement of said clutch is detected on the basis of a signal from said engagement detecting means.

7. The automatic transmission control apparatus according to claim 2, further comprising engagement detecting means for detecting start of engagement of said clutch, said expected time period during which said holding means holds said changeover means to said first position being a period starting when shift to said forward driving range is performed and ending when said start of engagement of said clutch is detected by said engagement detecting means.

8. The automatic transmission control apparatus according to claim 2, wherein said expected time period during which said holding means holds said changeover means to said first position is a period lasting until elapse of a length of time predetermined to start when shift to said forward driving range is performed and end immediately before said clutch is started to engage.

9. The automatic transmission control apparatus according to claim 1, wherein said expected time period is a predetermined time period.

10. The automatic transmission control apparatus according to claim 1, wherein said expected time period occurs when current rotational speed of the clutch is less than a rotational speed at a time of the shift from a non-driving range to the forward driving range by a predetermined amount.

* * * * *